(No Model.)
F. W. OHLINGER.
FERTILIZER DISTRIBUTER.
No. 507,923. Patented Oct. 31, 1893.
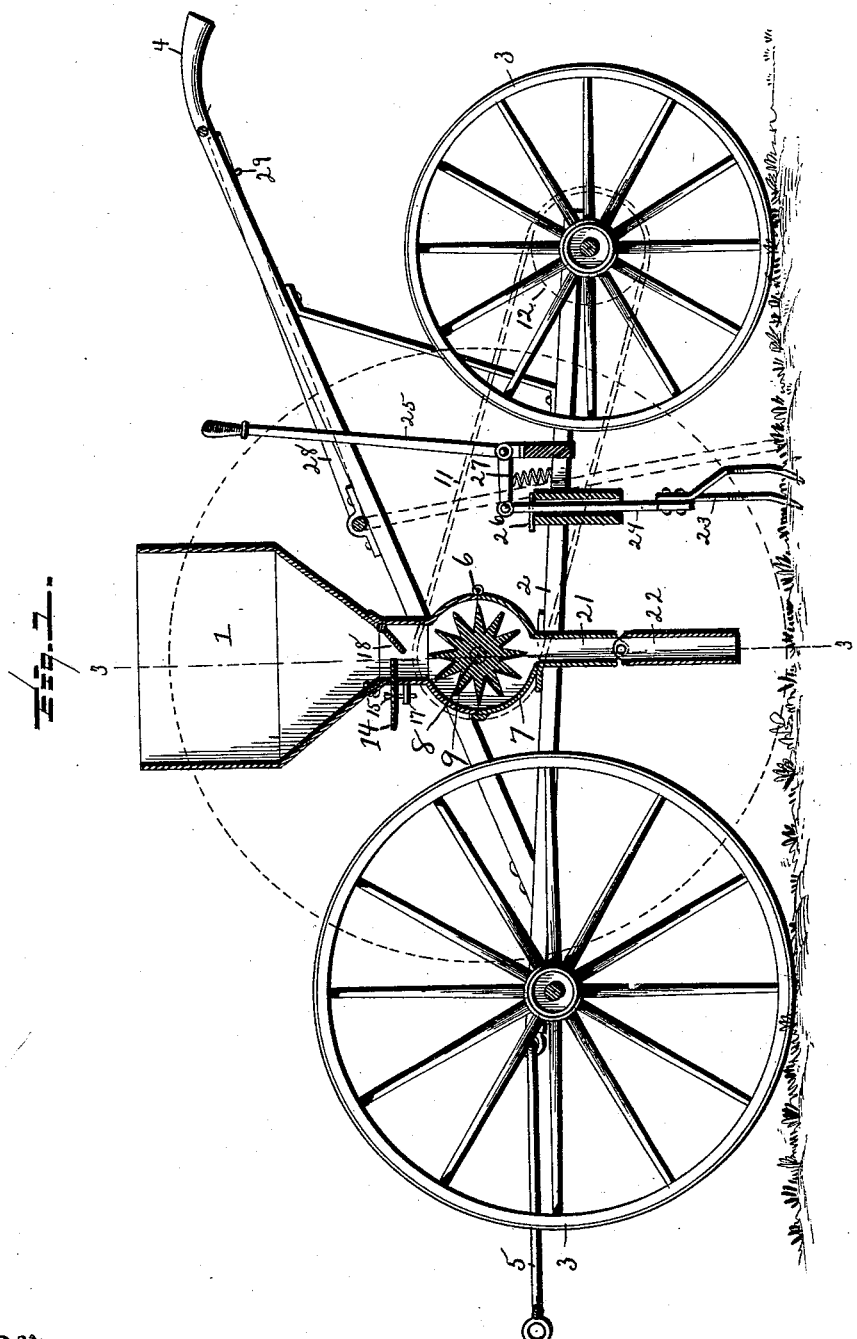
Witnesses
L. C. Hills
N. Moffett.
Inventor
F. W. Ohlinger
By Glascock & Geo
Attorneys.

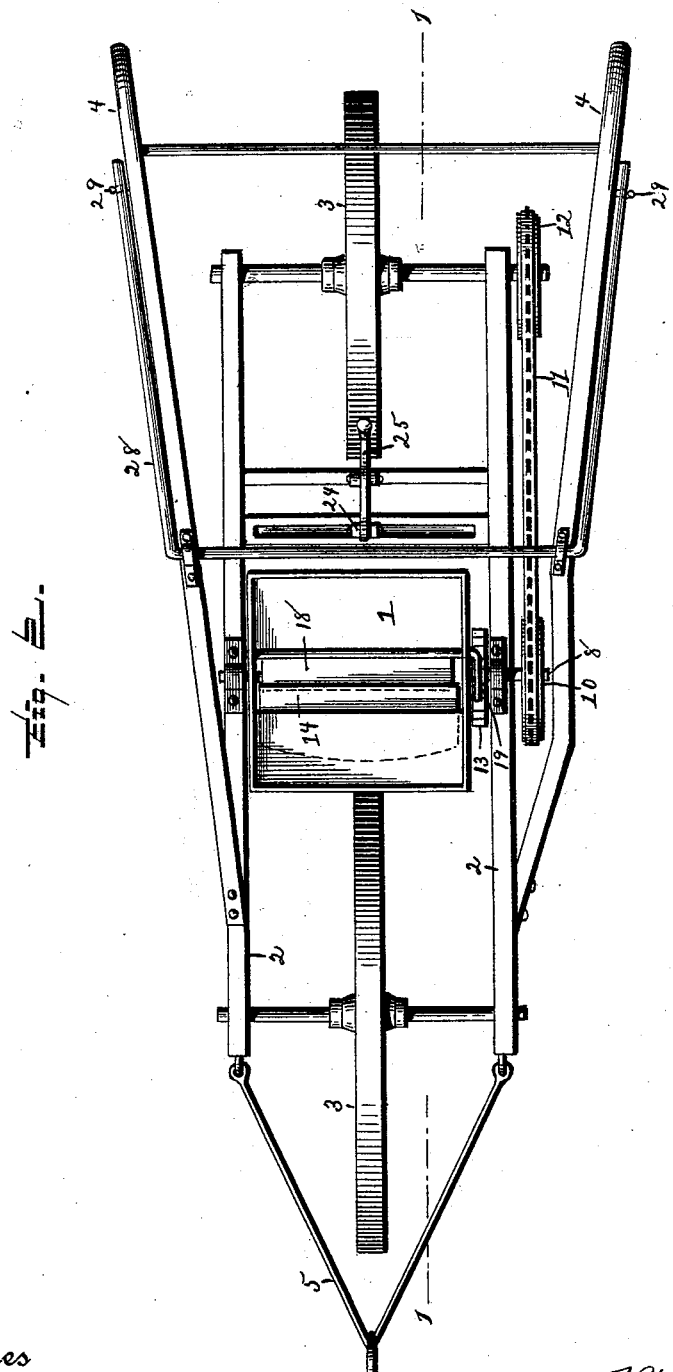

(No Model.) F. W. OHLINGER. 3 Sheets—Sheet 3.
FERTILIZER DISTRIBUTER.
No. 507,923. Patented Oct. 31, 1893.
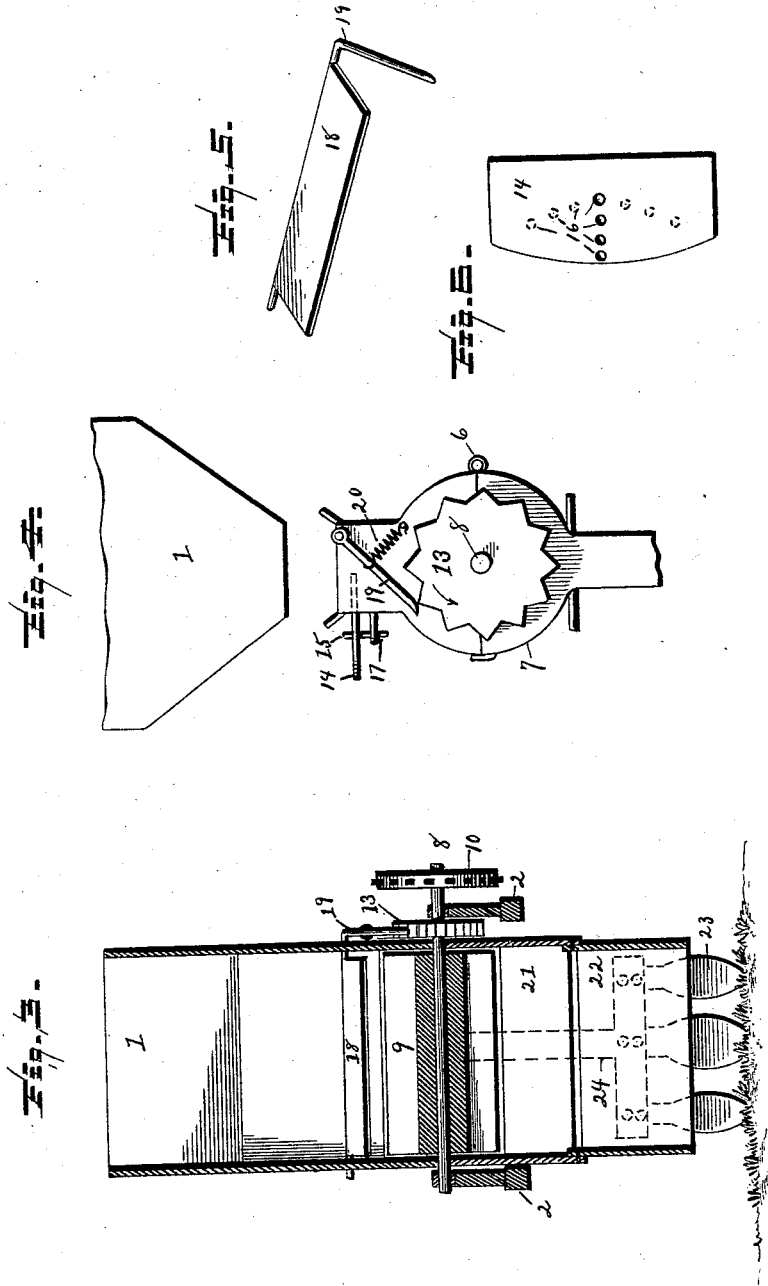

UNITED STATES PATENT OFFICE.

FREDERICK W. OHLINGER, OF WINTER HAVEN, FLORIDA.

FERTILIZER-DISTRIBUTER.

SPECIFICATION forming part of Letters Patent No. 507,923, dated October 31, 1893.

Application filed March 31, 1893. Serial No. 468,514. (No model.)

*To all whom it may concern:*

Be it known that I, FREDERICK W. OHLINGER, a citizen of the United States, residing at Winter Haven, in the county of Polk and State of Florida, have invented a certain new, useful, and valuable Improvement in Fertilizer-Distributers, of which the following is a full, clear, and exact description.

My invention has relation to fertilizer distributers. Said fertilizer distributer is mounted on suitable wheels and is adapted to drop the fertilizer and cover it.

In the accompanying drawings:—Figure 1, is a longitudinal sectional view of my invention. Fig. 2, is a top view thereof. Fig. 3, is a transverse sectional view on the line 3, 3, of Fig. 1, and Figs. 4, 5, and 6, are detail views of different parts of the invention and will be explained hereinafter.

My invention is described as follows:—It consists of the hopper 1, mounted on a suitable frame 2, and said frame in its turn is mounted on a pair of wheels 3, 3. The frame is provided with suitable handles 4, and the clevis or bail 5. The front and rear sides in Fig. 1, and said hopper are hinged at the point 6, to their support 7. The shaft 8, is journaled in suitable bearings between the support 7, and the lower part of the hopper 6. Said shaft is provided with a feed-cylinder which has cut at regular intervals in its periphery suitable grooves; parallel to the shaft 8. To the one end of the shaft 8, is secured a sprocket wheel 10, which is connected by a sprocket chain 11, with a second sprocket wheel 12, secured on the axle of the rear wheel on which the frame is mounted. Thus it will be seen that as the machine moves forward the shaft 8, is revolved. The shaft 8, is provided with the disk 13, which is secured to the shaft just outside of the hopper, and the periphery of said disk consists of a succession of indentations or protrusions, as shown in Fig. 4.

The hopper 1, is provided with a cut-off 14, of which Fig. 6, is a detail view. Said cut off is located just below the converging sides of the hopper and is adapted to be pushed in and pulled out and is held in proper place by suitable pegs 15, which pass through one of the perforations 16, and a perforation in the stationary lug 17, which is secured to the outside of the hopper. Immediately opposite the said cut off 14, is an agitator 18. The agitator consists of a pivoted blade having the angle extension 19, (see Fig. 5.) The angle extension is adapted to pass through the side of the hopper and rest on the irregular periphery of the disk 13, and the extension is held thereagainst by the coil spring 20, which has one end secured to the outside of the hopper and the other to the said extension. Thus it will be seen that as the disk 13, revolves the blade of the agitator will have a rising and falling motion.

The hopper support 7, is provided with an outlet 21, which extends down through the frame of the distributer. To the lower end of the outlet is hinged the conducting tube 22, which extends nearly to the ground. The fertilizer is conveyed through this part in a steady stream eight inches or more broad to the ground and is not blown away by the wind. The said conducting tube 22, will swing to the rear when it strikes a stone or other obstruction. If desirable the wheels supporting the frame can be attached to the shaft 8, as indicated by the dotted circular line in Fig. 1, and thus the wheels 3, 3, the sprocket wheels 10 and 12 and chain 11 would be dispensed with.

As the fertilizer falls to the ground it is mixed with the soil by the plow points 23, preferably three in number. This can be dispensed with when used by hand power. The middle point stands slightly behind the other two. These points are removably attached to the stock 24, and the upper end of the said stock passes through a suitable slot in a cross piece of the frame and is pivoted to an angle extension of the lever 25. By means of the said lever the plow points are raised by the operator to relieve them of whatever trash they accumulate. The depth of the plowing is regulated by the peg 26, which passes through a perforation in the plow stock and bears against the upper edges of the sides of the said slot. The extension of the lever 25, is held down by the coil spring 27, which has one of its ends attached to the said extension and its other end to the frame of the distributer.

The frame is provided with a support 28, which keeps it from falling over on its side when not in use. (This support consists of an iron rod the middle of which is journaled to the handles of the frame and the ends of the said rod are bent back and normally rest on the pins 29. But when the machine is not in use the ends of the said rod are swung over to the front and allowed to fall to the ground.) Thus the distributer is laterally supported.

Having thus described my invention, what I claim as new, and desire to secure by Letters Patent, is—

1. In a fertilizer distributer having a hopper provided with a suitable outlet, a revolving feed cylinder located in said hopper a disk having an irregular periphery secured on the axle of the revolving feed cylinder, a pivoted blade located in said hopper above the feed cylinder, said blade having an angle extension adapted to engage and be operated by the irregular periphery of said disk, as set forth.

2. A fertilizer distributer consisting of a hopper having a suitable outlet, said hopper mounted on a frame, a lever 25, having an angle extension fulcrumed to said frame, a spring attached at one end to said extension and at the other to said frame, a stock pivoted at its upper end to the entension, and plow plates secured to the lower end of the stock, as set forth.

In testimony whereof I affix my signature in presence of two witnesses.

FREDERICK W. OHLINGER.

Witnesses:
WM. UPCHURCH,
A. J. POWELL.